United States Patent [19]

Hickman

[11] Patent Number: 5,263,469
[45] Date of Patent: Nov. 23, 1993

[54] FOAM INSULATING A WATER HEATER

[75] Inventor: Michael O. Hickman, Guelph, Canada

[73] Assignee: GSW Inc., Fergus, Canada

[21] Appl. No.: 913,809

[22] Filed: Jul. 16, 1992

Related U.S. Application Data

[63] Continuation of Ser. No. 594,062, Oct. 9, 1990, abandoned.

[51] Int. Cl.$^5$ .......................... F24H 1/00; B29C 65/00
[52] U.S. Cl. ................................ 126/344; 264/46.5; 264/45.2; 126/361; 126/373
[58] Field of Search ................ 126/344, 373, 361; 122/494; 220/444, 448; 264/45.2, 46.2, 46.5, 46.6

[56] References Cited

U.S. PATENT DOCUMENTS

| | | | |
|---|---|---|---|
| 4,477,399 | 10/1984 | Tilton | 126/361 X |
| 4,790,290 | 12/1988 | Chevalier et al. | 126/361 |
| 4,911,142 | 3/1990 | Nelson | 126/344 |
| 4,972,967 | 11/1990 | Nelson | 126/361 |

*Primary Examiner*—Larry Jones

[57] ABSTRACT

The method of the present invention is for foam insulating a water heater where the water heater has an outer shell and an inner tank with tank fittings, the outer shell having tank fitting openings and the inner tank and outer shell being separated by an insulation space. The method comprises locating foam flow barriers between the inner tank and the outer shell around the periphery of each of the tank fitting openings and then spraying foam forming material into the insulation space with the foam barriers preventing the foam from escaping outwardly through the tank fitting openings.

6 Claims, 5 Drawing Sheets

5,263,469

FOAM INSULATING A WATER HEATER

This is a continuation application of application Ser. No. 07/594,062, filed on Oct. 9, 1990, now abandoned.

FIELD OF THE INVENTION

The present invention relates to a method of foam insulating a water heater.

BACKGROUND OF THE INVENTION

Water heaters include an inner tank and an outer shell. The outer shell includes shell openings to allow fittings to pass through the shell to the inner tank. Further, in the case of an electrical water heater, there are additional shell openings allowing access to electrical components located on the inner tank.

According to conventional practise, water heaters are now insulated by foam insulation formed in the space between the tank and the outer shell. It is important that the foam not escape outwardly and mar the outer surface of the outer shell.

The most widely accepted method of foam insulating a water heater is through the use of a bag placed between the tank and the shell. The bag is open at the top of the water heater and the insulation forming material is sprayed down into the bag which prevents the foam from escaping outwardly of the shell.

The use of foam trapping bags is costly from a material standpoint. It is further costly from a labour standpoint in that there is substantial time and a high degree of proficiency required in properly setting the bag between the shell and the tank.

SUMMARY OF THE INVENTION

The present invention provides a method of foam insulating a water heater having an outer shell and an inner tank with tank fittings, the outer shell having tank fitting openings and the inner tank and outer shell being separated by an insulation space. The method of the present invention comprises locating foam flow barriers between the inner tank and the outer shell around the periphery of each of the tank fitting openings and then spraying foam forming material into the insulation space. The foam flow barriers prevent the foam as it forms from escaping outwardly through the tank fitting openings.

According to the present invention, the foam flow barriers are easily located in position and are low in cost thereby overcoming the drawbacks of the prior art as noted above.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
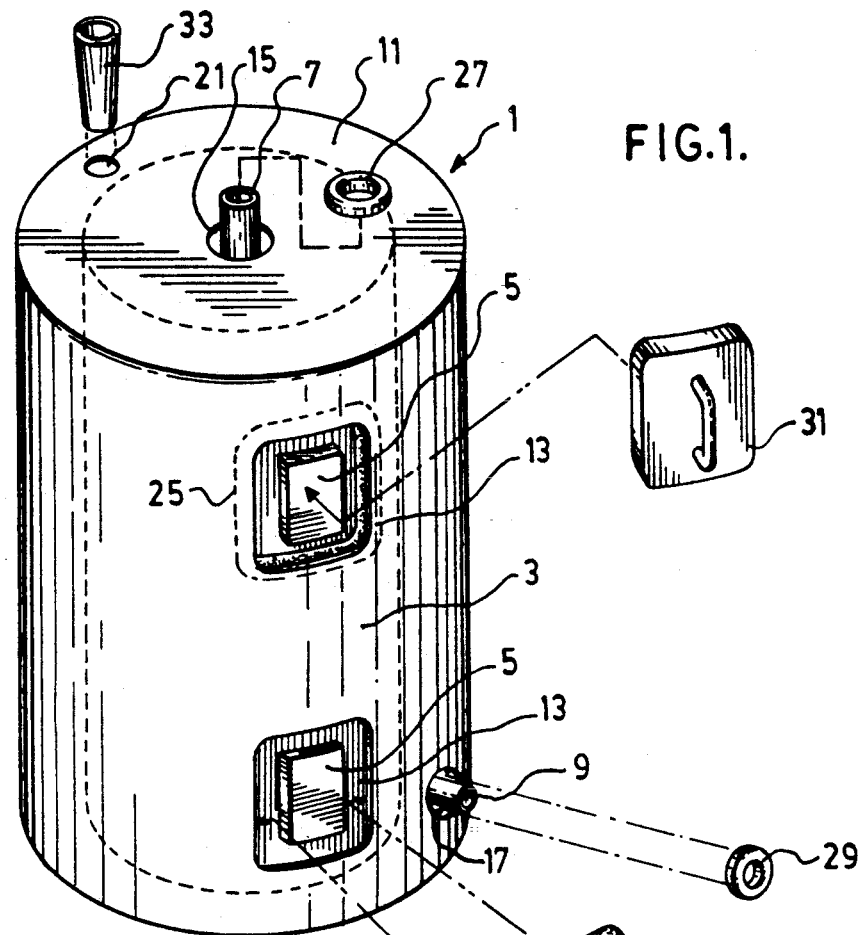
FIG. 1 is a perspective view looking down on an electric water heater to be foam insulated according to a preferred embodiment of the present invention.

FIG. 1 shows an electrical water heater generally indicated at 1. This water heater comprises an inner tank 3 which has electrical fittings 5 on one side of the tank. Extending upwardly from the top of the tank is a dip tube fitting 7 and located near the bottom of the tank is a water outlet fitting 9.

The tank is covered externally by an outer shell generally indicated at 11. As better seen in FIG. 3 of the drawings, shell 11 includes top and bottom shell portions 11a and 11b respectively.

Returning to FIG. 1 shell 11 includes a pair of generally rectangular openings 13 in the sidewall of the shell which allows access to the electrical fittings 5 on the inner tank. The shell further includes a top opening 15 which accommodates dip tube fitting 7 and a further side opening 17 accommodating water outlet fitting 9. Also provided in the top of the shell is a foam spray opening 21.

Tank 3 is of lesser diameter and shorter than shell 11 thereby leaving a foam insulation space 23 outwardly around and above the tank inside of the shell.

A plurality of foam flow barriers are provided according to the present invention for preventing foam from escaping out of insulation space 23. These foam barriers comprise barrier members 25 which fit at the openings 13, foam barrier 27 which fits at opening 15 and foam barrier 29 which fits at opening 17.

Figure 2:
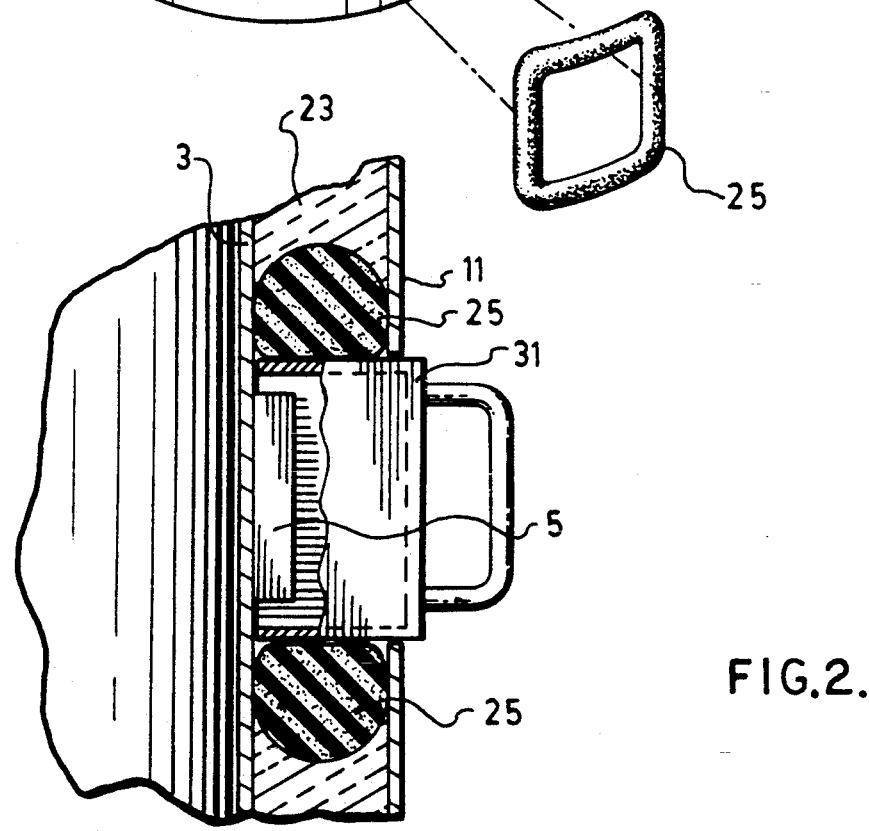
FIG. 2 is a sectional view through one of the electrical component regions of the water heater of FIG. 1.
Figure 3:
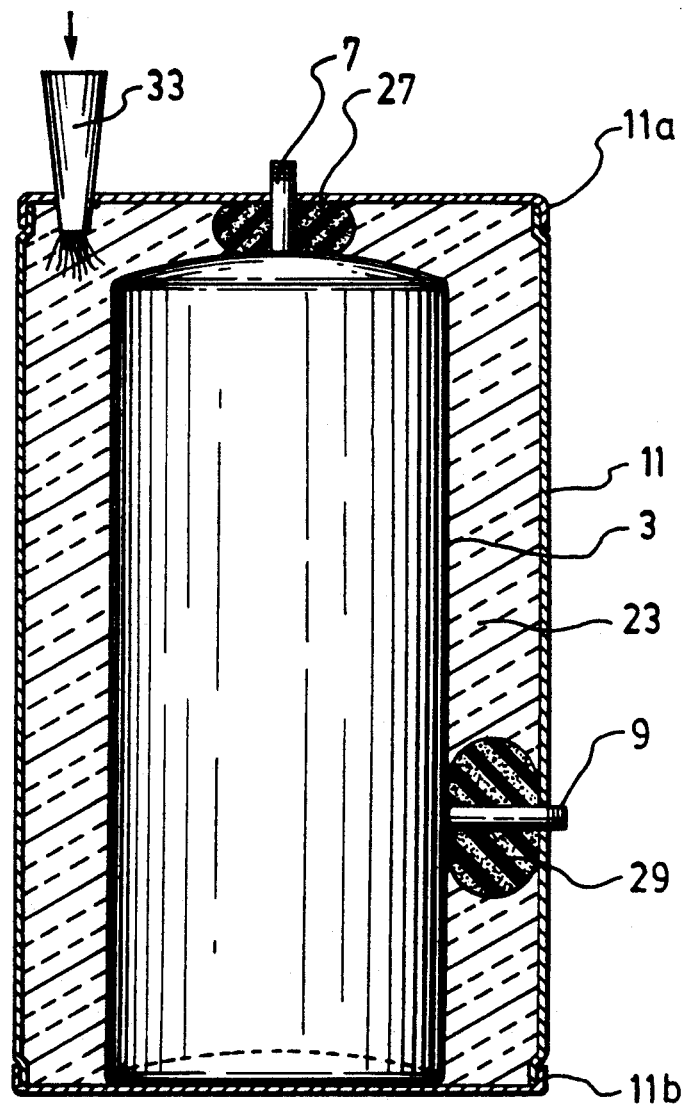
FIG. 3 is a an enlarged sectional view through the water heater of FIG. 1 during the foaming process.

The foam barriers themselves preferably have a bendable preformed molded foam or pre-cut fibreglass construction so that they are compressible and easily worked into position as seen in FIGS. 2 and 3 of the drawings. Each of the foam barriers 25 is placed in the insulation space 23 between tank 3 and shell 11 immediately around the periphery of each of the electrical fitting openings 13 through the shell. As will be seen in FIG. 2, each foam barrier 25 is squeezed between the tank and the shell where it holds itself in position. The actual installation of the foam barriers 25 is accomplished by first fitting the shell over the tank and then forcing the foam barrier through its respective shell opening 13 pushing it to its generally rectangular configuration around the electrical fitting peripherally of the rectangular shell opening squeezed between the tank and the shell.

As seen in FIG. 3, foam barrier 27 is squeezed between the shell and the tank around dip tube fitting 7 while foam barrier 29 is squeezed between the shell and the tank around water outlet fitting 9. These two foam barriers are initially located in position by first fitting them over the dip tube fitting and the water outlet fitting respectively to hold their positions and then the shell is dropped down over the tank to squeeze or compress them between the shell and the tank. flow barriers have a donut-like configuration, i.e. a continuous unbroken outer body defining a central opening in the barrier. In the case of the water supply fittings, the barriers are rounded with a small center opening and the case of the electrical fitting barriers, these have, as noted above, a more rectangular unbroken body defining a larger rectangular central opening.

After the water heater has been set up as shown in FIGS. 2 and 3 of the drawings, a foam spray nozzle 33 is the fitted down through shell opening 21 in the top of the shell now secured to the shell wall. This nozzle sprays a foam forming material which initially collects in the bottom of the insulation space 23 and then expands upwardly throughout the water heater all the way to the shell top in the insulation space. The foam as it expands is prevented from escaping outwardly of the tank at the tank fitting openings by the barrier action of the foam barriers. The foam bonds to the barriers which remain in the insulation space and provide additional insulation around the fitting. The positioning of the spray gun at shell opening 21 prevents the foam from escaping at this opening.

Although not necessary additional means for stabilizing the foam barriers at the electrical component areas may be provided. This means is in the form of a pair of fixtures 31 only one of which is seen in FIG. 1 of the drawings. Each of these fixtures is sized to fit tightly in its shell opening 13 and provide a block against collapsing of the foam barrier as shown in FIG. 2 of the drawings. However, it is to be appreciated that generally the foam barrier itself is squeezed sufficiently tightly in position to prevent its collapsing during the foam formation.

Figure 4:
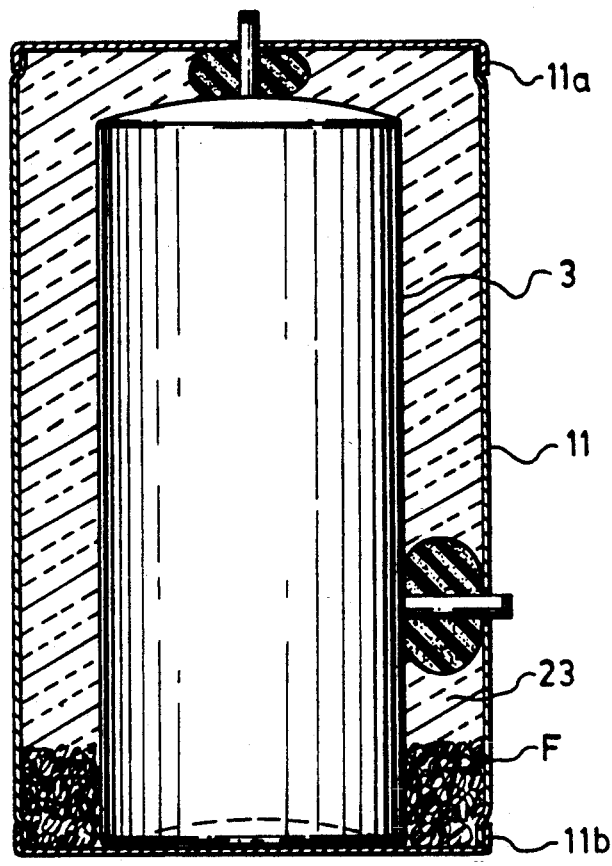
FIG. 4 is a sectional view through a further preferred method of preparing an electrical water heater for foam insulation according to the present invention.

FIG. 4 of the drawings shows a slightly modified arrangement designed to prevent any of the foam from escaping outwardly between the shell sidewall 11 and the shell bottom 11b. In this arrangement, a small wall of fibreglass F fills the lower end of the insulation space 23 between the tank and the shell. This wall of fibreglass extends above the joint between the shell bottom 11b and the shell wall 11 and therefore prevents any of the foam from escaping out of this joint.

Consistent with the earlier described arrangement, in the FIG. 4 set up foam barriers are once again fitted between the shell and the tank around the shell openings and the foam is formed in the insulation space as described with respect to FIG. 3 of the drawings.

Figure 5:
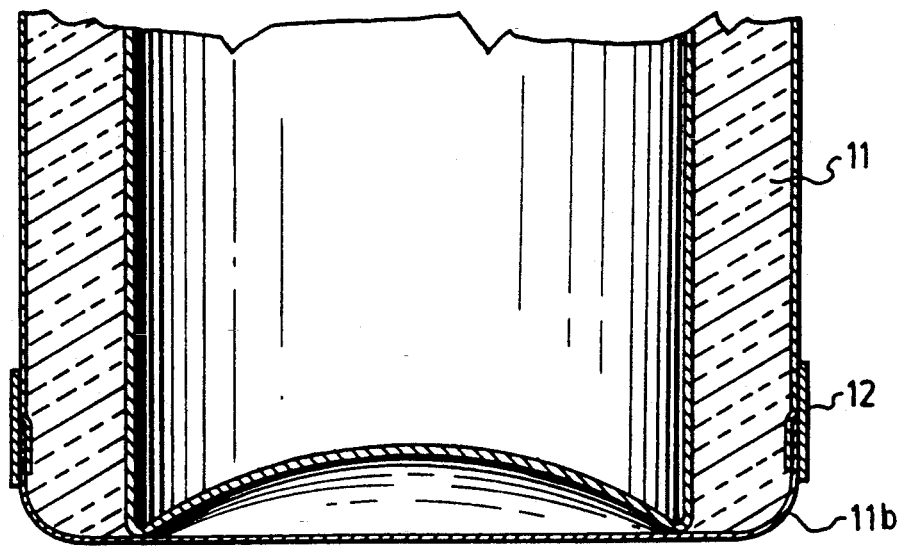
FIG. 5 is a sectional view through the lower end of still a further preferred set up for foam insulating an electrical water heater according to the present invention.

FIG. 5 shows a further preferred arrangement to prevent foam escaping between the shell bottom 11b and the shell wall 11. In this arrangement, a band 12 is removably fitted around the bottom of the water heater covering the shell joint as shown in FIG. 5 and one again prevents the possible escape of foam at this area.

Figure 6:
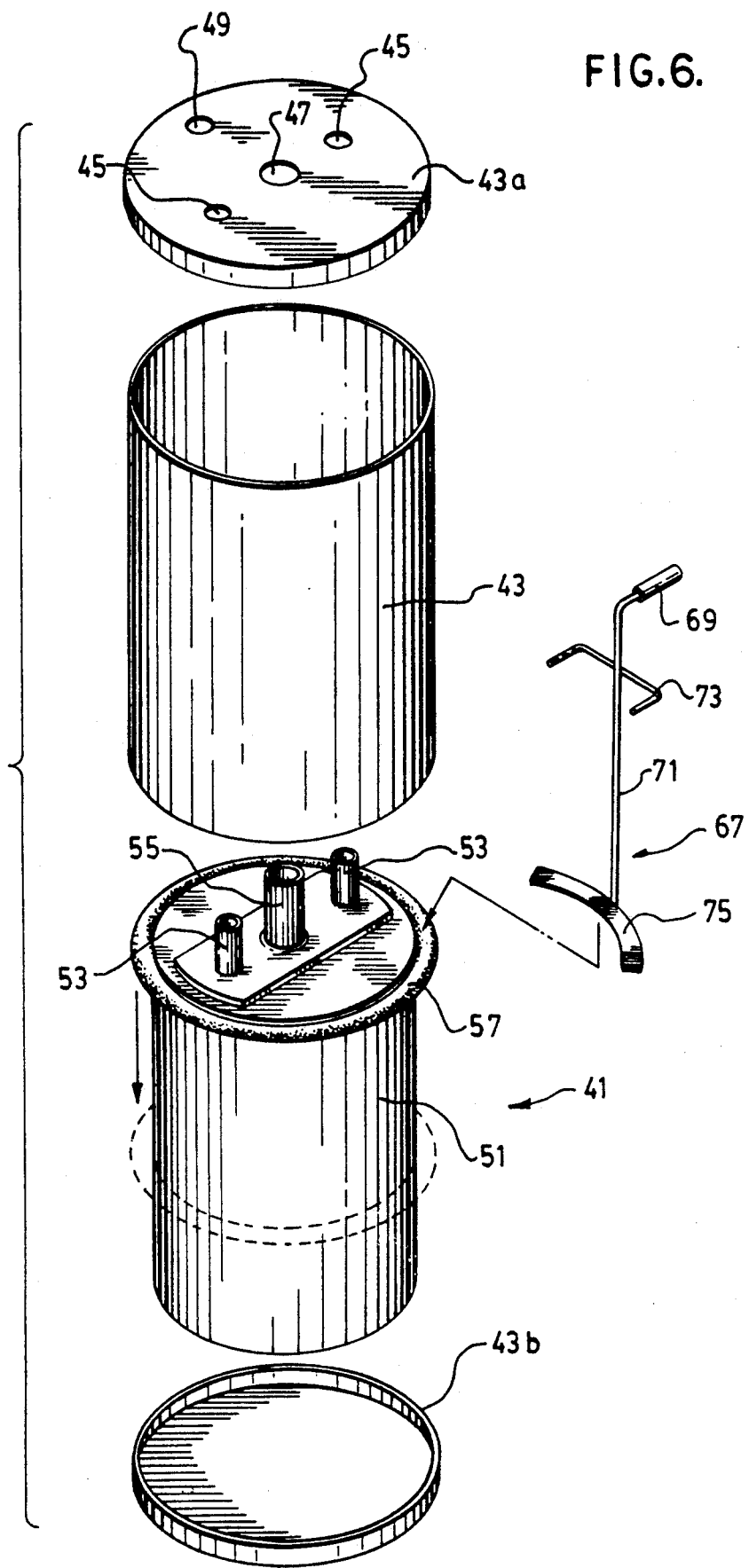
FIG. 6 is an exploded perspective view of a gas water heater in preparation for foam insulation according to a preferred embodiment of the present invention.
Figure 7:
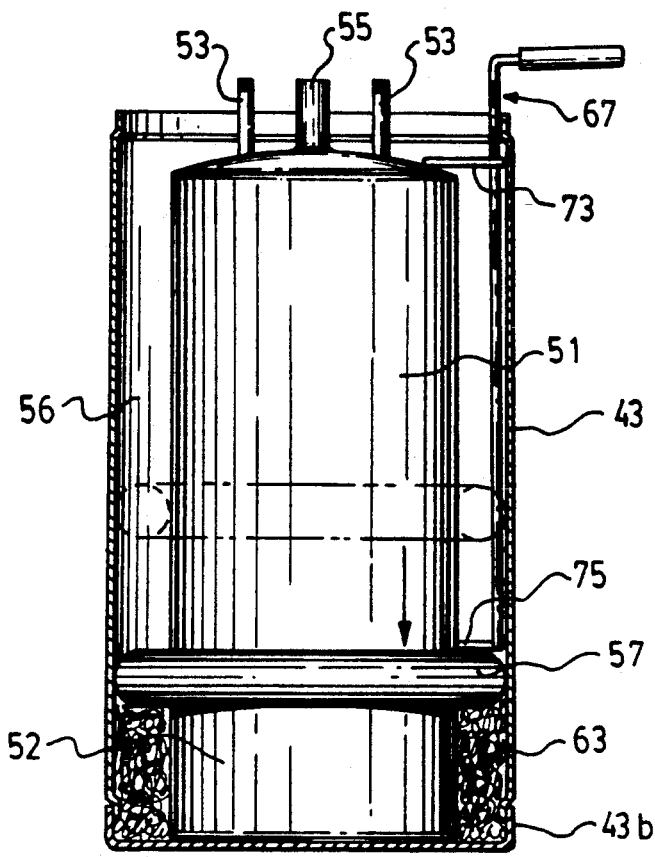
FIGS. 7 and 8 show in sequence steps for foam insulating of the gas water heater of FIG. 6.
Figure 8:
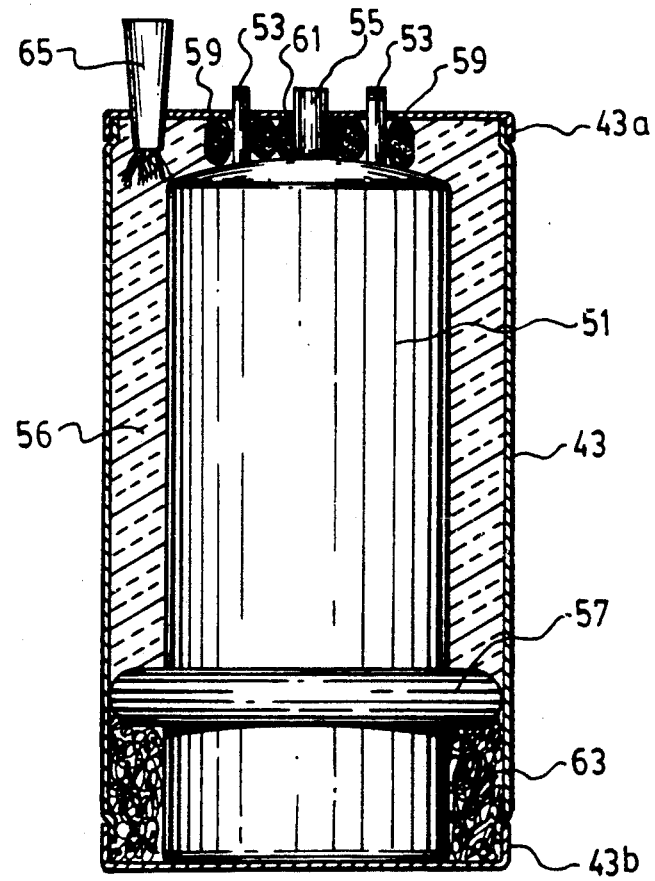

FIGS. 6 through 8 of the drawings show the preparation and foam insulation of a gas water heater as opposed to an electrical water heater. As will be appreciated a gas water heater includes a bottom end burner in the tank which is outwardly covered by a fibreglass layer between the tank and the outer shell. According to the present invention, the gas fired water heater once again incorporates foam barriers to prevent escape of foam at the shell openings as will be described later in detail and in addition includes an internal foam barrier fitted directly over the tank which prevents the foam from reaching down to the burner region where it would otherwise be broken down by the heat generated by the burner.

More particularly, FIG. 6 shows a gas fired water heater generally indicated at 41 comprising an outer shell 43 having top and bottom shell portions 43a and 43b respectively. The top shell portion 43a includes a pair of tank fitting openings 45, a further tank fitting opening 47 and a foam spray opening 49.

Housed within shell 43 is a water tank 51 which has a lower burner or combustion region 52. Tank 51 includes upper water supply tubes 53 and a center exhaust flue 55 from combustion region 52. Openings 45 and 47 in the shell top 43a allow these fittings to protrude from the tank outwardly through the shell.

Prior to placing the tank within the shell, a large foam barrier 57 which once again preferably has a preformed flexible foam or fibreglass construction is squeezed over the upper end of the tank. As the shell is dropped down over the tank and because of the tight fitting of the foam block 57 into the insulation space between the tank and the shell, foam barrier 57 tends to ride down the tank wall. However, it does not ride completely down the tank and as seen in FIG. 7 of the drawings, foam barrier 57 needs to be pushed downwardly along the tank until it sits directly atop fibreglass wall 63 which surrounds the combustion region 52 within the tank. Tool 67 best seen in FIG. 6 of the drawings has been specifically designed for proper location of foam barrier 57 prior to foaming of the tank.

Tool 67 referred to immediately above, has a handle 69, an elongated shaft 71, a stop member 73 and a lower arched pushing portion 75. AS seen in FIG. 7 of the drawings, the tool is fitted down into the insulation space 56 between the tank and the shell with pusher member 75 pushing on and rolling foam barrier 57 downwardly along the side of the tank. As will be appreciated this is required at different positions around the water heater in order to assure that the foam barrier when finally pushed down is in a horizontal position atop fibreglass wall 63. As best seen in FIG. 7 of the drawings, stop 73 of the tool is set at a height such that when it contacts the top of the tank, pusher 75 has forced foam barrier 57 down as far as it needs to go.

After setting the water heater up as shown in FIG. 7, foam barriers 59 are placed around water supply tubes 53 and a further foam barrier 61 is placed around exhaust flue 55. These foam barriers again preferably have a compressible preformed foam or fibreglass construction.

The shell top 43a is fitted down onto the shell sidewall 43. The shell top compresses the foam barriers 59 and 61 so that they are tightly packed within the water heater. A foam spray nozzle 65 is then fitted down through opening 49 and sprays the foam forming material into insulation space 56. The foam as it forms is prevented from passing downwardly beyond foam barrier 57 and is prevented from escaping outwardly through the shell top openings by the further foam barriers 59 and 61 respectively. It is also prevented from escaping upwardly through the spray gun opening by the spray gun itself. After the foam has formed the spray gun is removed and the spray gun opening is sealed.

Although various preferred embodiments of the invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A method of preparing a water heater for foam insulation where the water heater has an inner tank with electrical fittings on a vertical sidewall of the tank and an outer shell having a vertical sidewall with shell openings to the electrical fittings, the inner tank having a decreased diameter and height relative to the outer shell, said method comprising placing the shell over the tank thereby creating an insulation space of an established gap between the vertical sidewalls of the tank and the shell, forming externally of the water tank solid compressible foam flow barriers of heat insulating material which have a preset thickness greater than the established gap in the insulation space, inserting the foam flow barriers through the shell openings into the insulation space where the foam flow barriers are under compression between the tank and the shell, adjusting the foam flow barriers to a foam blocking and heat insulating position within the insulation space leaving no gap between the shell and the tank peripherally of the shell openings, the compression of the foam flow barriers holding the foam flow barriers in the foam blocking position at the vertical side walls of the tank and the shell, forming the foam insulation which bonds to the barriers in the insulation space and covering the shell openings with the foam flow barriers remaining in the foam blocking and heat insulating position immediately around the fittings internally of the water heater.

2. A method as claimed in claim 1, wherein the inner tank includes a top located dip tube fitting and a sideways extending water outlet fitting both extending outwardly through further shell openings in the shell, said method comprising locating further ring-like foam flow barriers around both the dip tube fitting and the water outlet fitting prior to fitting the shell over the tank using the dip tube fitting and the water outlet fitting to maintain location of the further foam flow barriers and compressing such further foam flow barriers between the tank and the shell by fitting the shell over the tank.

3. A method as claimed in claim 1 including forming said foam flow barriers from a solid foam material and adjusting position of said foam flow barriers to align peripherally with said shell openings.

4. A method as claimed in claim 1 wherein the outer shell includes a bottom shell portion and a side wall shell portion with a joint therebetween, said method including exteriorly wrapping the outer shell at the joint and preventing the outward flow of the foam between the side wall shell portion and the bottom shell portion.

5. A method as claimed in claim 1 including forming said foam flow barriers from a fiberglass material and adjusting position of the foam flow barriers to align peripherally with said shell openings.

6. A method of preparing a water heater for foam insulation where the water heater has an inner tank with electrical fittings on a vertical side wall of the tank and an outer shell having a vertical side wall with shell openings to the electrical fittings, the shell openings having peripheries defining maximum size of the shell openings, the inner tank having a decreased diameter and height relative to the outer shell, said method comprising placing the shell over the tank thereby creating an insulation space of an established gap between the vertical side walls of the tank and the shell, forming externally of the water tank solid compressible shape adjustable foam flow barriers of heating insulating material which have a preset thickness greater than the established gap in the insulation space, inserting the foam flow barrier through the shell openings into the shell openings into the insulation space where the foam flow barriers are under compression between the tank and the shell, manually adjusting the foam flow barriers to a foam blocking and heat insulating position within the insulation space aligned with the peripheries of the shell openings, the compression of the foam flow barriers holding the foam flow barriers in the foam blocking position at the vertical side walls of the tank and the shell, forming the foam insulation which bonds to the barriers in the insulation space, and covering the shell openings with the foam flow barriers remaining in the foam blocking and heat insulating position immediately around the fittings internally of the water heater.

* * * * *